(12) United States Patent
Baugh

(10) Patent No.: US 8,262,336 B2
(45) Date of Patent: Sep. 11, 2012

(54) METHOD FOR HANDLING WELDING GAS BOTTLES

(76) Inventor: Benton F. Baugh, Houston, TX (US)

( * ) Notice: Subject to any disclaimer, the term of this patent is extended or adjusted under 35 U.S.C. 154(b) by 0 days.

(21) Appl. No.: 12/661,147

(22) Filed: Mar. 12, 2010

(65) Prior Publication Data

US 2011/0223002 A1    Sep. 15, 2011

(51) Int. Cl.
*B60P 1/04*    (2006.01)
(52) U.S. Cl. .......................................... 414/490; 414/444
(58) Field of Classification Search .................. 414/490, 414/444, 639
See application file for complete search history.

(56) References Cited

U.S. PATENT DOCUMENTS 6,709,222 B2 *    3/2004    Inman, Jr. ...................... 414/490

* cited by examiner

*Primary Examiner* — Saul Rodriguez
*Assistant Examiner* — Willie Berry, Jr.

(57) ABSTRACT

The method of landing a welding gas bottle in a predetermined location on a support tray on a welding machine by providing a non-supporting area between two supporting areas and a having a hand truck which provides a welding gas bottle support which will fit between the supporting areas and allows the hand truck support to pass between the support areas of the support tray and thereby transferring the support of the welding gas bottle from the hand truck to the support tray by a pivoting of the handle of the hand truck.

4 Claims, 3 Drawing Sheets

METHOD FOR HANDLING WELDING GAS BOTTLES

TECHNICAL FIELD

This invention relates to the general subject of safely handling and installing welding gas bottles on welding machines.

CROSS-REFERENCE TO RELATED APPLICATIONS

Not applicable.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

The field of this invention is that of the handling of gas bottles onto the back of welding machines. A typical restriction on what can be expected of workers in an industrial environment will be to lift 20-80 lbs. occasionally and 1-25 lbs. frequently, and 10 lbs. constantly. With these OSHA type restrictions on exertions which can be expected of employees, the handling of weld bottles has been a startling exception.

Welding gas bottles are normally associated with welding as an inert gas shield is desirable to shield the hot weld area from atmospheric oxygen. Exposing the hot weld area to atmospheric oxygen can substantially reduce the quality of the welds. Other applications of the welding gas bottles are to provide oxygen and acetylene for cutting metal to a desire shape in preparation of welding it together.

Welding gas bottles are typically removed from storage by picking up on the flat bottom plate of a 2 wheel dolly and moved to an area near the end of a welding mobile machine. The bottles will typically weigh about 185 lbs. each. The mobile welding machine will have a support tray about 3 inches above the floor to accept the welding gas bottle. The welder will then "bear hug" the 185 lb. welding gas bottle, pick it up about 6 inches off the floor, rotate his body around about 45 degrees while holding the load, and land the welding gas bottle on the support tray. The welder does on a daily basis what is unimaginable within OSHA guidelines.

Overhead cranes and gib cranes have been outfitted with slings to pick up the bottles on a safer basis, but the inconvenience of moving the welding machines to a position suitable for crane loading and waiting for your turn to use the crane typically make these methods too inconvenient to use.

For the past 100 years, millions of welding gas bottles have been man-handled at OSHA defying and back wrenching loads for one simple reason: they had no better choice. The present invention provides the choice not seen for the past 100 years, the safe and ergonomic handling of welding gas bottles.

BRIEF SUMMARY OF THE INVENTION

The object of this invention is to a method of welding gas bottles which does not require individual welders to lift excessive loads.

A second object of this invention is to provide a method of handling welding gas bottles which is convenient enough to use that welders will use the method.

A third object of this invention is to provide a method of handling welding gas bottles which will take the handling operations to the location of the welding machine rather than the welding machines needing to be taken to the handling location.

DETAILED DESCRIPTION OF THE INVENTION

Define Hand Truck

Figure 1:
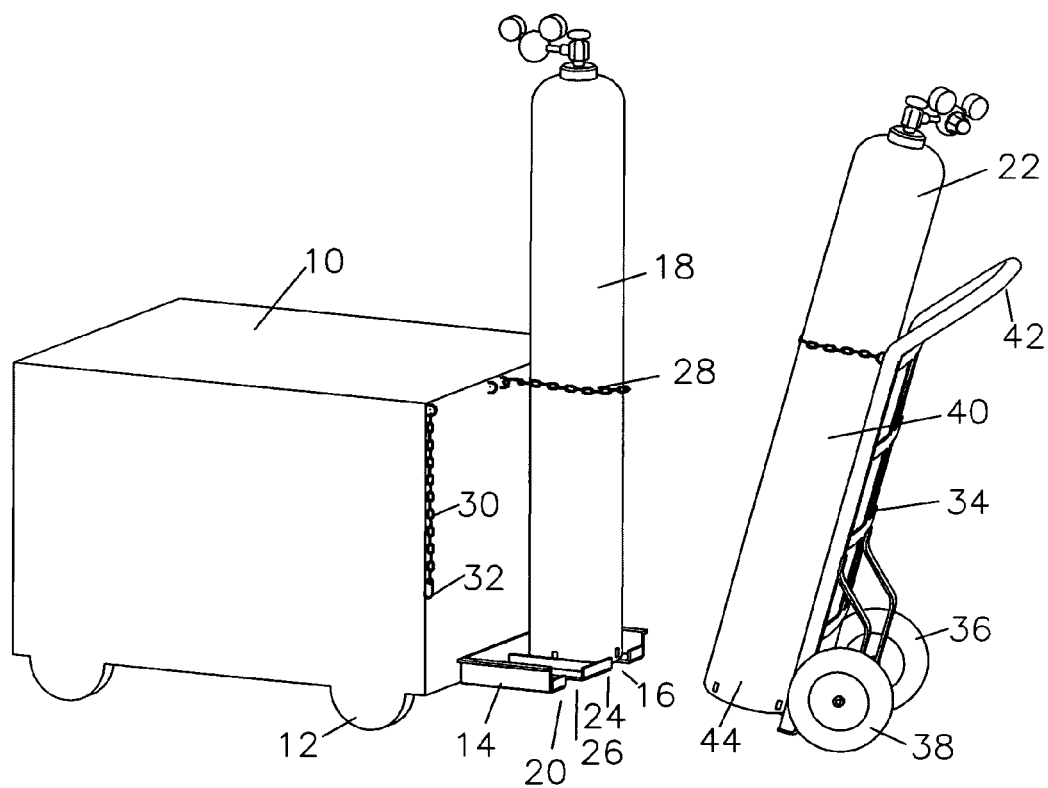
FIG. 1 is a perspective view of the welding bottle support and hand truck with the modifications of this invention.

Referring now to FIG. 1, a mobile welding machine 10 is shown having wheels 12, a support tray 14. Support tray 14 has a first area 16 presently supporting a welding gas bottle 18 and a second support area 20 suitable for supporting a second welding gas bottle 22. First area 16 has a notched portion 24 and second support area 20 has a notched portion 26.

Safety chain 28 is shown wrapped around welding gas bottle 18. Safety chain 30 having hook 32 is positioned for engaging a second welding gas bottle 22.

Hand truck 34 having wheels 36 and 38 is shown supporting welding gas bottle 22. Safety chain 40 is shown securing welding gas bottle 22 to hand truck 34. Straps, belts, and clamps as are well understood in the art can be used in place of the chain for the safety protection.

When the welder holds the handle portion 42 in the appropriate position, the load will be balanced for easy moving. When the handle portion 42 is moved slightly downward, the lower portion 44 of the welding gas bottle 22 will be raised higher than the support tray 14, allowing the welding gas bottle 22 to be moved into position above said second support area 20. When the handle portion 42 is raised. the welding gas bottle 22 will be landed on said second support area 20.

Figure 2:
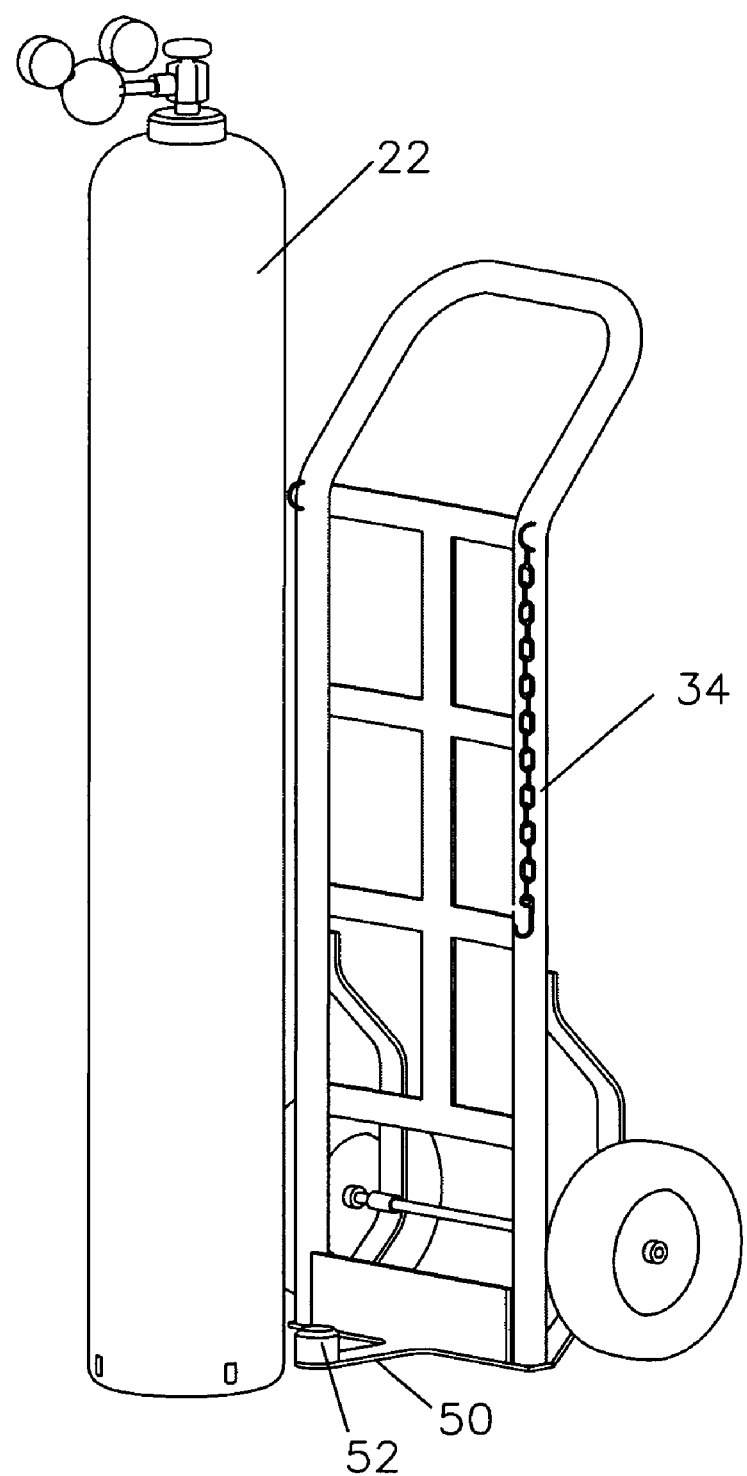
FIG. 2 is a view a view of the welding gas bottle separated from the hand truck.

Referring now to FIG. 2, the welding gas bottle 22 is shown separately from the hand truck 34. The support for the welding gas bottle 22 is a tongue shaped extension 50 having a raised portion 52. The width of the tongue portion 50 is less than the width of the notched portion 26 (FIG. 1) such that when the welding gas bottle 22 is lowered onto the second support area 20 (FIG. 1), the tongue shaped extension 50 passes through the notched portion 26 (FIG. 1) allowing welding gas bottle 22 to land on the second support area 20 (FIG. 1).

Figure 3:
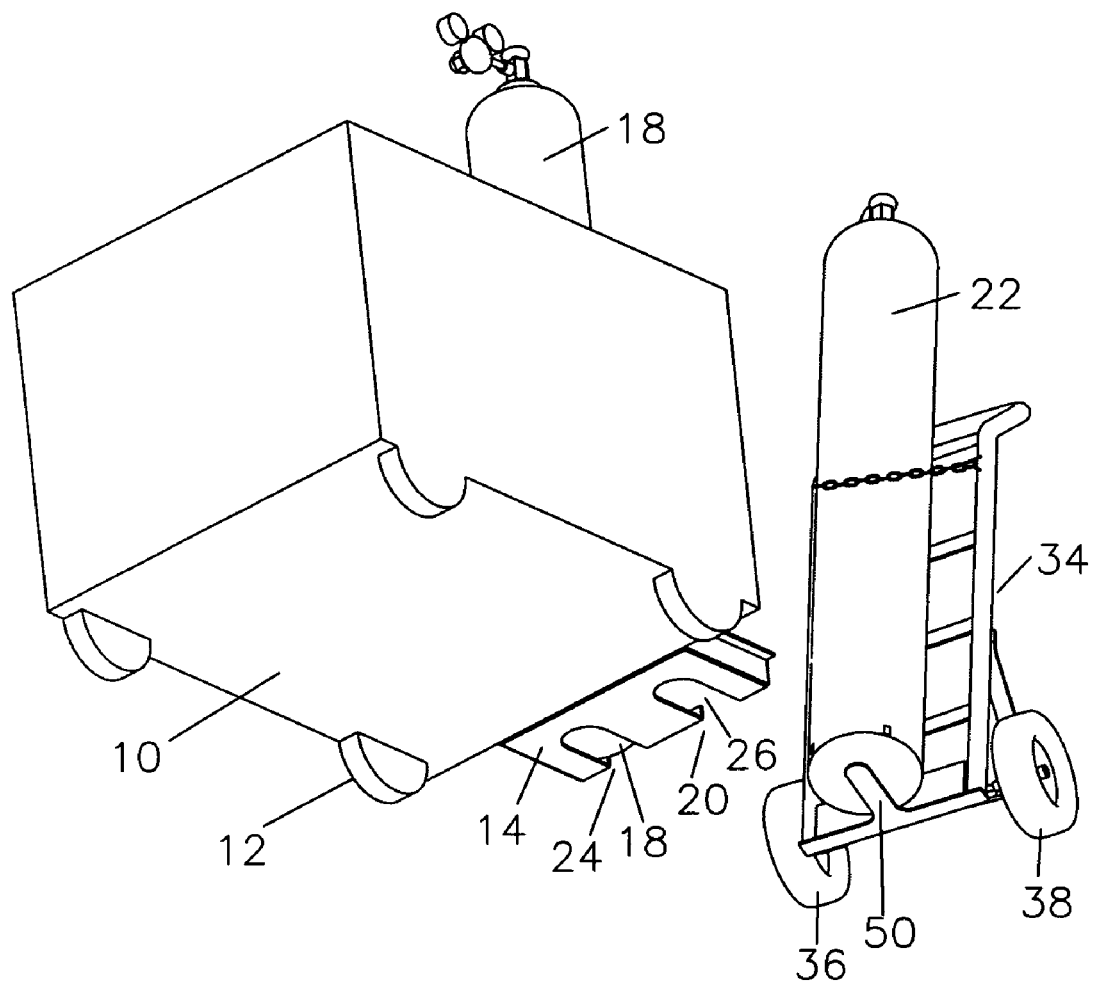
FIG. 3 is a view of the lower portion of the welding bottle support and hand truck as seen from below.

Referring now to FIG. 3, a view of the equipment is shown from below. Support tray 14 is shown attached to mobile welding machine 10. Welding gas bottle 28 is seen through notched portion 24. Tongue shaped extension 50 of hand truck 34 supports welding gas bottle 22 and will pass through notched portion 26 as welding gas bottle 22 is landed on second support area 20.

Actual construction of the device of this invention demonstrated that rather than bear-hug lifting of a 185 lb. welding gas bottle, a welder would be able to install the welding gas bottle on the mobile welding machine with one hand. Whereas reasonable safety indicates that a person should keep a firm hand on the hand truck during moving, the actual act of moving it from the balanced position to landing on the support tray could easily be done with 2 fingers.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

That which is claimed is:

1. A welding system comprising the following elements:
   one or more welding gas bottles having a circular base,
   a support tray on a welding machine for supporting said one or more welding gas bottles in a predetermined location, said support tray having a supporting portion below said circular base of said welding gas bottles and having a non-supporting section below said circular base of said welding gas bottles,
   a moving device for moving said one or more welding gas bottles, said moving device having a supporting portion below said circular base of said welding gas bottles and having a non-supporting section below said circular base of said welding gas bottles,
   such that when said device for moving said one or more welding gas bottles positions said one or more welding gas bottles in said predetermined location, said supporting portion of said moving device is not over in the same vertical area as said supporting portion of said support tray, and
   further comprising said tray supporting portion having two spaced apart areas and said tray non-supporting portion being an area between said tray supporting portion and said moving device support portion having a central portion to fit between said spaced apart areas.

2. The apparatus of claim 1 further comprising said central portion of said moving device portion has a protrusion to engage a recess in said welding gas bottle.

3. The apparatus of claim 1, further comprising said one or more gas bottles are welding gas bottles.

4. The apparatus of claim 1, further comprising said machine is a welding machine.

* * * * *